(12) United States Patent
Yang et al.

(10) Patent No.: US 8,767,147 B2
(45) Date of Patent: Jul. 1, 2014

(54) LIQUID CRYSTAL DISPLAY WHEREIN A FIRST LIGHT BLOCKING PORTION AND A FIRST COLORED PORTION EXTENDS GENERALLY ALONG A GATE LINE AND GENERALLY COVERS THE GATE LINE AND A THIN FILM TRANSISTOR

(75) Inventors: Seung-Suk Yang, Asan-si (KR);
Young-Goo Song, Asan-si (KR);
Jae-Yong Lim, Seongnam-si (KR);
In-Ho Park, Cheonan-si (KR);
Kyung-Suk Jung, Iksan-si (KR)

(73) Assignee: Samsung Display Co., Ltd. (KR)

( * ) Notice: Subject to any disclaimer, the term of this patent is extended or adjusted under 35 U.S.C. 154(b) by 235 days.

(21) Appl. No.: 12/896,678

(22) Filed: Oct. 1, 2010

(65) Prior Publication Data
US 2011/0085103 A1 Apr. 14, 2011

(30) Foreign Application Priority Data

Oct. 8, 2009 (KR) ........................ 10-2009-0095779

(51) Int. Cl.
*G02F 1/1335* (2006.01)
*G02F 1/1333* (2006.01)
(52) U.S. Cl.
USPC ........................................... 349/106; 349/110
(58) Field of Classification Search
USPC .................... 349/97, 104–108, 110, 139, 140
See application file for complete search history.

(56) References Cited

U.S. PATENT DOCUMENTS

| 7,345,732 | B2 | 3/2008 | Liu et al. | |
|---|---|---|---|---|
| 2008/0068537 | A1* | 3/2008 | Lee et al. | 349/106 |
| 2008/0239187 | A1* | 10/2008 | Yang et al. | 349/44 |
| 2009/0040441 | A1* | 2/2009 | Choi | 349/106 |
| 2009/0147188 | A1* | 6/2009 | Yang et al. | 349/106 |
| 2009/0207360 | A1* | 8/2009 | Takeda et al. | 349/129 |
| 2009/0213320 | A1* | 8/2009 | Son et al. | 349/191 |
| 2009/0244418 | A1* | 10/2009 | Pak et al. | 349/39 |

FOREIGN PATENT DOCUMENTS

| JP | 2000-206541 A | 7/2000 |
|---|---|---|
| JP | 2001-209053 A | 8/2001 |
| JP | 2009-069723 A | 4/2009 |
| KR | 1020030048655 A | 6/2003 |
| KR | 1020050001158 A | 1/2005 |
| KR | 100796753 B1 | 1/2008 |
| KR | 1020080081426 A | 9/2008 |
| KR | 1020080104496 A | 12/2008 |
| KR | 1020090006705 A | 1/2009 |

* cited by examiner

Primary Examiner — Paul Lee
(74) Attorney, Agent, or Firm — Innovation Counsel LLP (57) ABSTRACT

A liquid crystal display according to an exemplary embodiment of the present invention includes: a first substrate; a first signal line disposed on the first substrate; a thin film transistor connected to the first signal line; a color filter and a light blocking member disposed on the first substrate; a pixel electrode disposed on the color filter and the light blocking member; and a colored member formed on the pixel electrode and disposed on the light blocking member, the colored member having an upper surface that is generally planar with an upper surface of the color filter.

20 Claims, 7 Drawing Sheets

FIG.6B

LIQUID CRYSTAL DISPLAY WHEREIN A FIRST LIGHT BLOCKING PORTION AND A FIRST COLORED PORTION EXTENDS GENERALLY ALONG A GATE LINE AND GENERALLY COVERS THE GATE LINE AND A THIN FILM TRANSISTOR

CROSS-REFERENCE TO RELATED APPLICATION

This application claims priority to, and the benefit of, Korean Patent Application No. 10-2009-0095779 filed in the Korean Intellectual Property Office on Oct. 8, 2009, the entire contents of which are incorporated herein by reference.

BACKGROUND OF THE INVENTION (a) Field of the Invention
The present invention relates to a liquid crystal display.
(b) Description of the Related Art
Liquid crystal displays (LCDs) are among the most widely used types of flat panel displays. A typical LCD configuration includes a pair of panels provided with field-generating electrodes, and a liquid crystal (LC) layer interposed between the two panels. The LCD displays images by applying voltages to the field-generating electrodes, thus generating an electric field in the LC layer that orients the LC molecules within. These directionally-oriented molecules adjust the polarization of incident light.

One common LCD configuration utilizes a structure in which pairs of field generating electrodes are respectively formed on two opposing display panels. Among the two display panels, a plurality of pixel electrodes and thin film transistors are arranged in a matrix format on one display panel (hereinafter referred to as "thin film transistor array panel"), whereas color filters of (typically) red, green, and blue and a light blocking member are formed on the other display panel, and one common electrode covers the entire surface of this other display panel (hereinafter referred to as "common electrode panel").

However, in this configuration, the pixel electrodes and the corresponding color filters are small, and disposed on opposite display panels, and are difficult to align properly. This LCD configuration is thus susceptible to alignment error.

To solve this problem, a color filter on array (COA) structure is sometimes employed. LCDs constructed in COA configurations have their pixel electrodes and color filters formed on the same display panel. More specifically, in this structure, a light blocking member as well as the color filter are formed on the same display panel as the pixel electrode.

After forming the color filter on the display panel, an organic layer having a predetermined thickness is formed to prevent components of the color filter from flowing into the pixel electrode or the liquid crystal layer. The pixel electrode and the light blocking member are then formed on the organic layer. Here, the upper surface of the light blocking member winds up being lower than the upper surfaces of various other layers, so that the top surface of the display panel is uneven. This results in a non-uniform cell gap, with step discontinuities generated at points where, for example, the light blocking members meet the pixel electrodes. Due to these step discontinuities in height, and thus in cell gap, the liquid crystal behaves differently at the edges of the pixel electrodes. This results in image defects such as stains or light leakage, effectively increasing average cell size.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention maintains a cell interval of a liquid crystal display, and correctly controls the liquid crystal at the edge of the pixel electrode.

A liquid crystal display according to an exemplary embodiment of the present invention includes: a first substrate; a first signal line disposed on the first substrate; a thin film transistor connected to the first signal line; a color filter and a light blocking member disposed on the first substrate; a pixel electrode disposed on the color filter and the light blocking member; and a colored member formed on the pixel electrode and disposed on the light blocking member, the colored member having an upper surface that is generally planar with an upper surface of the color filter.

The light blocking member and the colored member may include a first light blocking portion and a first colored portion respectively, the portions each extending generally along the first signal line and generally covering the first signal line and the thin film transistor.

The liquid crystal display may further include a second signal line disposed on the first substrate, and connected to the thin film transistor, wherein the light blocking member and the colored member further include a second light blocking portion and a second colored portion respectively, the second light blocking portion and the second colored portion each extending generally along a second signal line, and generally covering the second signal line.

The liquid crystal display may further include a spacer to maintain a cell interval, and the colored member may also have a height lower than the spacer.

The spacer may be formed in the same layer as the colored member.

The light blocking member may have a height lower than the color filter in a region where the light blocking member is proximate to the color filter.

The cell interval may be substantially uniform throughout the region where the light blocking member is proximate to the color filter.

The liquid crystal display may further include a second substrate facing the first substrate, and a liquid crystal layer interposed between the first substrate and the second substrate and including a plurality of liquid crystal molecules, wherein, for a boundary region where the color filter is proximate to the light blocking member, the liquid crystal molecules disposed in the boundary region are pre-tilted in substantially the same direction as the liquid crystal molecules outside the boundary region and disposed on the color filter.

The liquid crystal display may further include liquid crystal molecules disposed in the boundary region and that are pre-tilted according to branch electrodes on the color filter.

The liquid crystal display may further include a first polarizer and a second polarizer disposed on outer surfaces of, respectively, the first substrate and the second substrate, wherein the transmissive axes of the first polarizer and the second polarizer are crossed, and wherein the liquid crystal molecules are oriented parallel to the first substrate and the second substrate when an electric field is applied thereto.

According to an exemplary embodiment of the present invention, a colored member is formed on the light blocking member between the color filters, smoothing out height differences between the light blocking member and color filters. This makes the cell interval, or cell gap, more uniform at edges of the pixel electrode, allowing for better control of liquid crystal molecule orientation, and preventing the stains or the light leakage.

Also, the colored member and the spacer are formed simultaneously (i.e., during the same deposition process), allowing the colored member to be formed without an additional process.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display according to an exemplary embodiment of the present invention will be described with reference to FIG. 1.

Figure 1:
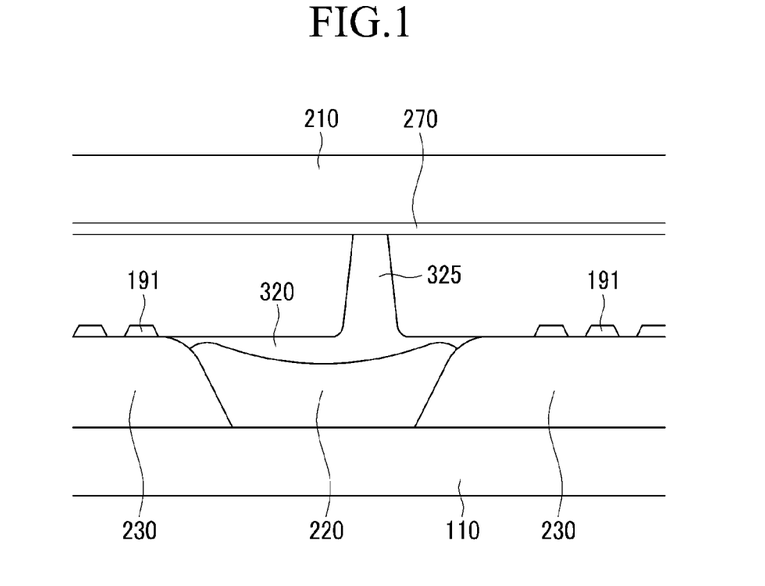
FIG. 1 is a cross-sectional view of a liquid crystal display according to an exemplary embodiment of the present invention.

FIG. 1 is a cross-sectional view of a liquid crystal display according to an exemplary embodiment of the present invention.

As shown in FIG. 1, a liquid crystal display according to an exemplary embodiment of the present invention includes a lower panel 100 and an opposite upper panel 200 facing each other, and a liquid crystal layer 3 interposed therebetween.

The lower panel 100 includes a substrate 110, color filters 230 formed on the substrate 110, a light blocking member 220 formed on the substrate 110 and disposed between the color filters 220, a pixel electrode 191 formed on the color filters 230, a colored member 320 disposed on the light blocking member 220, and a spacer 325 formed with the same layer as the colored member 320.

The upper panel 200 includes a common electrode 270 formed on the substrate 210.

The height of a portion of the light blocking member 220 may be lower than the height of the color filter 230, and the interval between the lower panel 100 and the upper panel 200 may be made substantially uniform by the colored member 320 disposed on the light blocking member 220.

Figure 2:
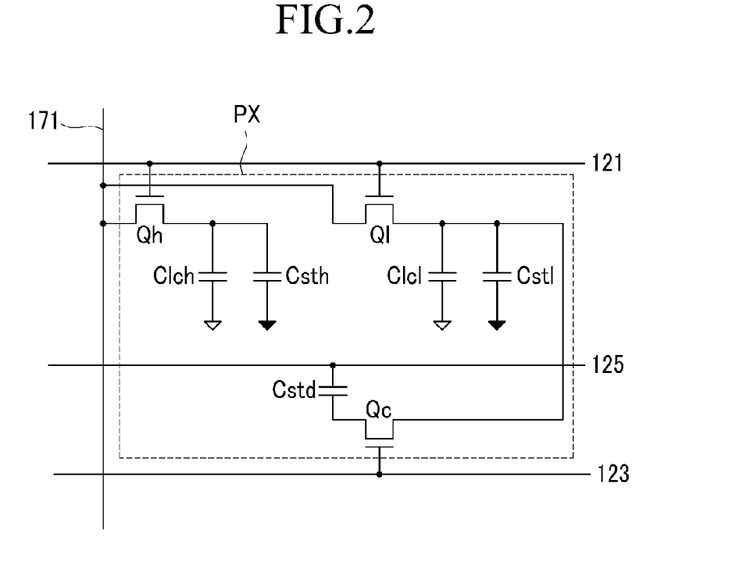
FIG. 2 is an equivalent circuit diagram of one pixel of a liquid crystal display according to an exemplary embodiment of the present invention.
Figure 3:
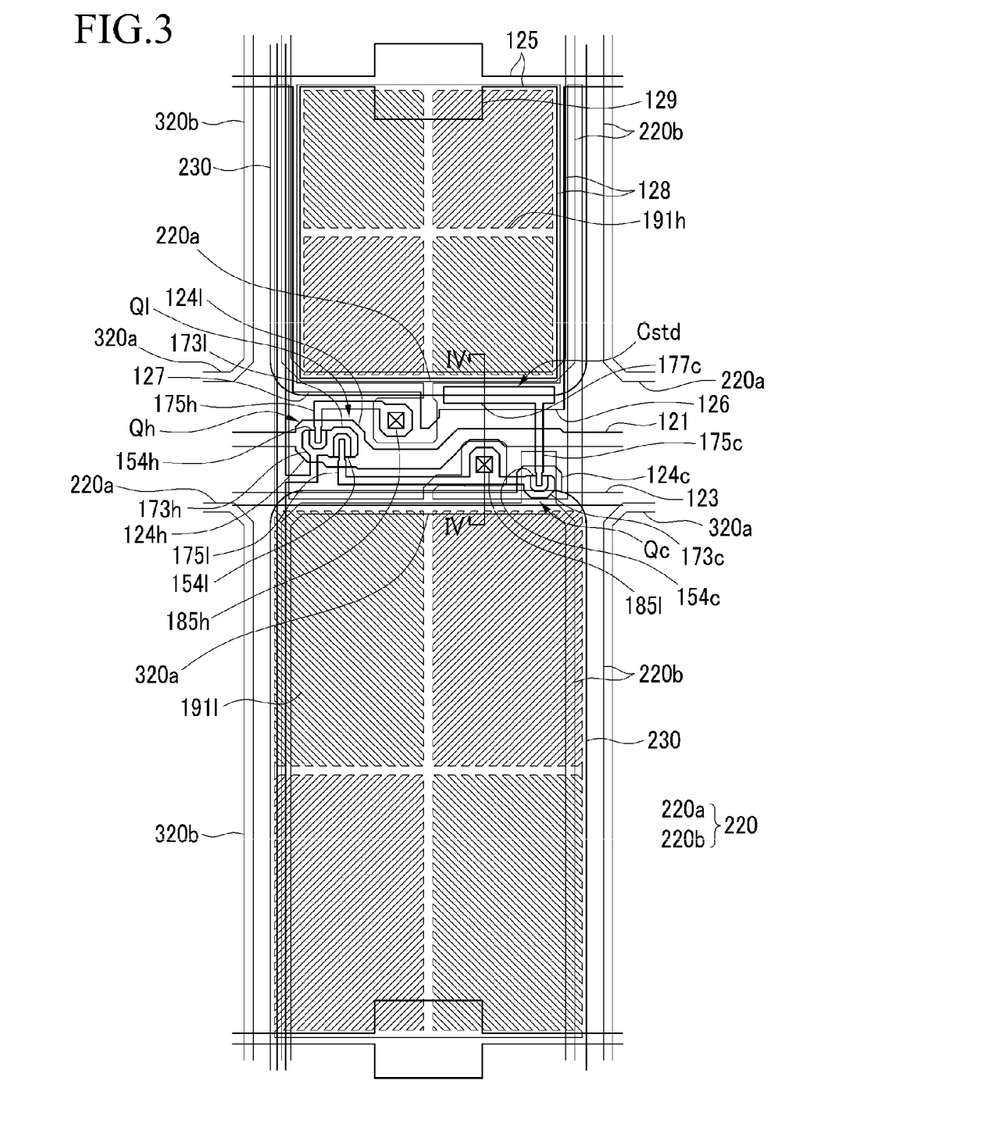
FIG. 3 is a layout view of a liquid crystal display according to an exemplary embodiment of the present invention.
Figure 4:
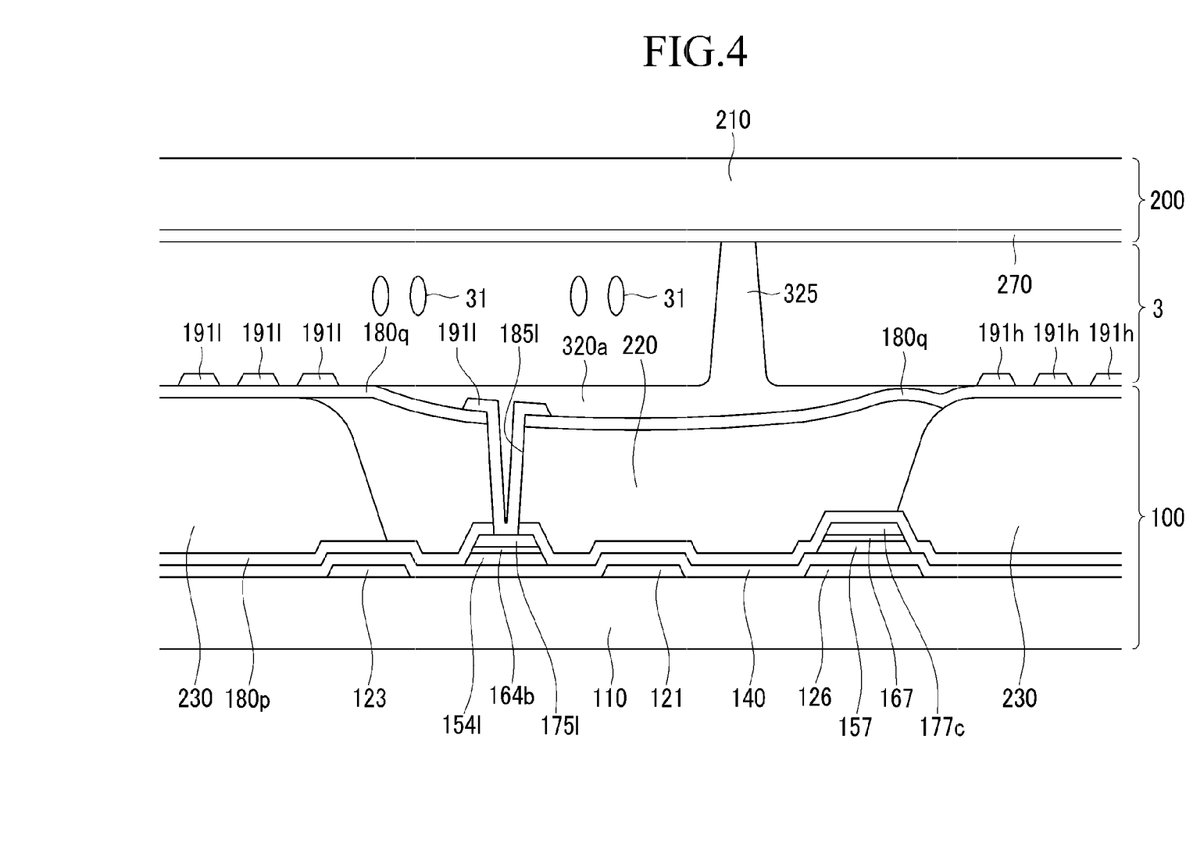
FIG. 4 is a cross-sectional view of the liquid crystal display of FIG. 3 taken along the line IV-IV.
Figure 5:
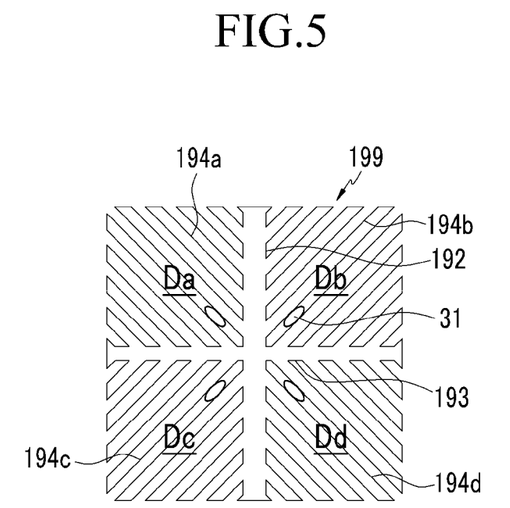
FIG. 5 is a layout view of the pixel electrode shown in the liquid crystal display of FIG. 4.

Next, a liquid crystal display according to an exemplary embodiment of the present invention will be described with reference to FIGS. 2 to 5. FIG. 2 is an equivalent circuit diagram of one pixel of a liquid crystal display according to an exemplary embodiment of the present invention, FIG. 3 is a layout view of a liquid crystal display according to an exemplary embodiment of the present invention, FIG. 4 is a cross-sectional view of the liquid crystal display of FIG. 3 taken along the line IV-IV, and FIG. 5 is a layout view of the pixel electrode shown in the liquid crystal display of FIG. 4.

Referring to FIG. 2, a liquid crystal display according to an exemplary embodiment of the present invention includes signal lines such as a gate line 121, a storage electrode line 125, a step-down gate line 123, and a data line 171, as well as a pixel PX connected thereto.

The pixel PX includes first to third switching elements Qh, Ql, and Qc, first and second liquid crystal capacitors Clch and Clcl, first and second storage capacitors Csth and Cstl, and a step-down capacitor Cstd. Here, the first switching element Qh and the first thin film transistor Qh, the second switching element Ql and the second thin film transistor Ql, and the third switching element Qc and the third thin film transistor Qc are denoted by the same reference numerals. That is, the switching elements Qh, Ql, and Qc and their corresponding thin film transistors are referred to interchangeably.

The first and second thin film transistors Qh and Ql are each connected to both the gate line 121 and the data line 171, and the third thin film transistor Qc is connected to the step-down gate line 123.

The first and second thin film transistors Qh and Ql are both three-terminal elements provided in the lower panel 100, and each has a control terminal connected to the gate line 121, and an input terminal connected to the data line 171. As can be seen in FIG. 2, first and second thin film transistors Qh and Ql also have, respectively, an output terminal connected to the first and second liquid crystal capacitors Clch and Clcl, and the first and second storage capacitors Csth and Cstl.

The third thin film transistor Qc is a three terminal element provided in the lower panel 100, with a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by overlapping first and second subpixel electrodes 191h and 191l (connected to the first and second switching elements Qh and Ql) with the common electrode 270 of the upper panel 200. The first and second storage capacitors Csth and Cstl are formed by overlapping the storage electrode line 125 and storage electrode 129 with the first and second subpixel electrodes 191h and 191l.

The step-down capacitor Cstd is connected to the output terminal of the third thin film transistor Qc and the storage electrode line 125, and is formed by an overlap of the storage electrode line 125 (provided in the lower panel 100) with the output terminal of the third thin film transistor Qc where the two overlap each other via an insulator.

Next, the liquid crystal display shown in FIG. 2 will be described with reference to FIG. 3 to FIG. 5 in detail.

A liquid crystal display according to the present exemplary embodiment includes a lower panel 100 and an upper panel 200 facing each other, a liquid crystal layer 3 interposed between the two display panels 100 and 200, and a pair of polarizers (not shown) attached at the outer surfaces of the display panels 100 and 200.

Now, the lower panel 100 will be described.

A plurality of gate conductors are formed on an insulation substrate 110, each including a plurality of gate lines 121, a plurality of step-down gate lines 123, and a plurality of storage electrode lines 125.

The gate lines 121 and the step-down gate lines 123 transfer gate signals, and generally extend in a transverse direction. Each gate line 121 includes a first gate electrode 124h and a second gate electrode 124l protruding generally upward and downward respectively, and each step-down gate line 123 includes a third gate electrode 124c protruding generally upward. The first gate electrode 124h and the second gate electrode 124l are connected to each other, thereby forming one protrusion.

The storage electrode lines 125 are generally extended in the transverse direction, and transfer a predetermined voltage such as a common voltage Vcom. The storage electrode line 125 includes a storage electrode 129 protruding generally upward and downward, a pair of longitudinal portions 128 extending generally perpendicular to the gate line 121 downward, and a transverse portion 127 connecting the ends of a pair of longitudinal portions 128 to each other. The transverse portion 127 includes a storage expansion 126 extended generally downward.

A gate insulating layer 140 is formed on the gate conductors 121, 123, and 125.

A plurality of semiconductor stripes (not shown), made of hydrogenated amorphous silicon (a-Si), polysilicon, or any other suitable material, are formed on the gate insulating layer 140. The semiconductor stripes are generally extended in the vertical direction, and each semiconductor stripe includes first and second semiconductors 154h and 154l extending toward the first and second gate electrodes 124h and 124l and connected to each other, as well as a third semiconductor 154c connected to the second semiconductor 154l. The third semiconductor 154c is extended, thereby forming a fourth semiconductor 157.

A plurality of ohmic contact stripes (not shown) are formed on the semiconductor stripes, first ohmic contacts (not shown) are formed on the first semiconductor 154h, and a second ohmic contact 164b and a third ohmic contact (not shown) are also formed on the second semiconductor 154l and the third semiconductor 154c. The ohmic contact stripes include a first protrusion (not shown) forming a pair along with the first ohmic contact island and disposed on the first protrusion of the semiconductor, a second protrusion (not shown) forming a pair along with the second ohmic contact island and disposed on the second protrusion of the semiconductor, and a third protrusion (not shown) forming a pair along with the third ohmic contact island and disposed on the third protrusion of the semiconductor. The third ohmic contact is extended, thereby forming a fourth ohmic contact 167.

A data conductor is formed on the ohmic contacts 164b and 167. This data conductor includes a plurality of data lines 171, a plurality of first drain electrodes 175h, a plurality of second drain electrodes 175l, and a plurality of third drain electrodes 175c.

The data lines 171 transmit data signals and extend in the longitudinal direction, thereby intersecting the gate lines 121 and the step-down gate lines 123. Each data line 171 includes a first source electrode 173h and a second source electrode 173l generally forming a "W" shape together and extending toward the first gate electrode 124h and the second gate electrode 124l.

The first drain electrode 175h, the second drain electrode 175l, and the third drain electrode 175c each have one end portion shaped as a relatively wide area, and an opposite end portion with a generally linear, or bar, shape. The bar end portions of the first drain electrode 175h and the second drain electrode 175l are partially enclosed by the first source electrode 173h and the second source electrode 173l, respectively. The wide end portion of the second drain electrode 175l is shaped generally in a "U" configuration, forming the third source electrode 173c. An expansion 177c of the third drain electrode 175c overlaps the storage expansion 126, thereby forming step-down capacitor Cstd, and the bar end portion is partially enclosed by the third source electrode 173c.

The first/second/third gate electrodes 124h/124l/124c, the first/second/third source electrodes 173h/173l/173c, and the first/second/third drain electrode s175h/175l/175c respectively form the first/second/third thin film transistors (TFTs) Qh/Ql/Qc along with the first/second/third semiconductor islands 154h/154l/154c, and channels of the thin film transistors are respectively formed in the semiconductors 154h/154l/154c between the source electrodes 173h/173l/173c and the drain electrodes 175h/175l/175c.

Also, the semiconductor stripes (i.e., the structures that include the semiconductors 154h, 154l, and 154c except for the channel region between the source electrodes 173h, 173l, and 173c and corresponding drain electrodes 175h, 175l, and 175c) have substantially the same shape as the data conductors 171, 175h, 175l, and 175c, and the underlying ohmic contacts 164b and 167. That is, the semiconductor stripes, including the semiconductors 154h, 154l, and 154c, have portions that are exposed without being covered by the data conductors 171, 175h, 175l, and 175c, and portions between the source electrodes 173h, 173l, and 173c and the drain electrodes 175h, 175l, and 175c.

A lower passivation layer 180p is formed on the data conductors 171, 175h, 175l, 175c and the exposed semiconductors 154h, 154l, and 154c. The lower passivation layer 180p can be made of an inorganic insulator such as silicon nitride or silicon oxide, or any other suitable material.

A color filter 230 is formed on the lower passivation layer 180p. The color filter 230 is formed in most of the region except for where the first thin film transistor (Qh), the second thin film transistor (Ql), and the third thin film transistor (Qc) are positioned. Also, each color filter 230 may be formed in spaces between neighboring data lines 171. Each color filter 230 may display a primary color such as red, green, or blue.

As shown in FIG. 1, light blocking member 220 is formed on a region that the color filter 230 does not occupy, and is also formed on a portion of the color filter 230. The light blocking member 220 is referred to as a black matrix, and prevents light leakage. The light blocking member 220 extends generally along the gate line 121 and the step-down gate line 123, and includes a first light blocking member 220a covering a region where the first thin film transistor Qh, the second thin film transistor Ql, and the third thin film transistor Qc are disposed, as well as a second light blocking member 220b extending generally along the data line 171. That is, portions of the light blocking member 220 generally cover both the thin film transistors (or at least portions thereof) and the data lines of the display. The height of the portion of the light blocking member 220 may be lower than that of the color filter 230.

An upper passivation layer 180q is formed on the color filter 230 and the light blocking member 220. The upper passivation layer 180q prevents the color filter 230 and the light blocking member 220 from lifting, and acts as a barrier suppressing contamination of the liquid crystal layer 3 by organic materials such as a solvent flowing from the color filters 230. This helps to reduce defects such as afterimages that may be generated during driving.

The lower passivation layer 180p, the light blocking member 220, and the upper passivation layer 180q have a plurality of first contact holes 185h and a plurality of second contact holes 185l respectively exposing the wide ends of the first drain electrodes 175h and the wide ends of the second drain electrodes 175l.

A plurality of pixel electrodes 191 are formed on the upper passivation layer 180q.

Referring to FIG. 3, each pixel electrode 191 includes first and second subpixel electrodes 191h and 191l that are separated from each other via two gate lines 121 and 123, are disposed in each pixel area, and that neighbor each other in the column direction.

Additionally, the first and second subpixel electrodes 191h and 191l respectively include a basic electrode 199 shown in FIG. 5, or at least one modification thereof.

As shown in FIG. 5, the overall shape of the basic electrode 199 is generally that of a quadrangle, and includes a transverse stem 193 and a longitudinal stem 192 that are crossed. Also, the basic electrode 199 is divided into a first subregion Da, a second subregion Db, a third subregion Dc, and a fourth subregion Dd by the transverse stem 193 and the longitudinal stem 192, and each of the subregions Da-Dd includes a plurality of first to fourth minute branch electrodes 194a, 194b, 194c, and 194d.

The first minute branch 194a extends obliquely from the transverse stem 193 or the longitudinal stem 192 in the upper-left direction, and the second minute branch 194b obliquely extends from the transverse stem 193 or the longitudinal stem 192 in the upper-right direction. The third minute branch 194c obliquely extends from the transverse stem 193 or the longitudinal stem 192 in the lower-left direction, and the fourth minute branch 194d obliquely extends from the transverse stem 193 or the longitudinal stem 192 in the lower-right direction.

The first to fourth minute branches 194a-194d form angles of about 45 degrees or 135 degrees with the gate lines 121 or the transverse stem 193. Also, the minute branches 194a-194d of two neighboring subregions Da-Dd may be crossed.

The width of the minute branches 194a, 194b, 194c, and 194d may be in the range of 2.5 μm to 5.0 μm, and the interval between the neighboring minute branches 194a, 194b, 194c, and 194d of one subregion Da, Db, Dc, and Dd may be in the range of 2.5 μm to 5.0 μm.

According to another exemplary embodiment of the present invention, the widths of the minute branches 194a to 194d may decrease with distance from the transverse stem 193 or the longitudinal stem 192, and the difference between the greatest width of a minute branch and its smallest width may be in the range of 0.2 μm to 1.5 μm.

The first subpixel electrode 191h and the second subpixel electrode 191l include an outer stem enclosing the outer. The longitudinal portion of the outer stem extends generally along the data line 171, thereby preventing capacitive coupling between the data line 171 and the subpixel electrodes 191h, 191l.

The first and second subpixel electrodes 191h and 191l are respectively connected to the first and second drain electrodes 175a and 175b through the contact holes 185h and 185l, and receive data voltages from the first and second drain electrodes 175h and 175l. The first/second subpixel electrodes 191a/191b, when a data voltage is applied, generate an electric field along with the common electrode 270 of the upper panel 200. This electric field orients the liquid crystal molecules of the liquid crystal layer 3 between the electrodes 191a/191b and 270, thus altering the luminance of light transmitted through the liquid crystal layer 3 and, in the aggregate, generating an image.

The edges of the first to fourth minute branches 194a-194d distort the electric field, in particular generating a horizontal component that imparts an incline to liquid crystal molecules 31. The horizontal component of the electric field is almost parallel to the edges of the first to fourth minute branches 194a-194d. Accordingly, the liquid crystal molecules 31 are inclined in the direction parallel to the length direction of the minute branches 194a-194d. In the embodiment of FIG. 5, the branches 194a-d extend in four different directions, and thus orient the liquid crystal molecules 31 along four separate directions. These differing orientation directions act to, in the aggregate, widen the viewing angle of the display.

The first subpixel electrode 191h, the common electrode 270, and the liquid crystal layer 3 interposed therebetween collectively form the first liquid crystal capacitor Clch. The second subpixel electrode 191l, the common electrode 270, and the liquid crystal layer 3 interposed therebetween collectively form the second liquid crystal capacitor Clcl. These two capacitors Clch, Clcl help maintain the voltage after the first and second thin film transistors Qh and Ql are turned off.

The first and second subpixel electrodes 191h and 191l overlap the storage electrode line 125 as well as the storage electrode 129, thereby forming the first and second storage capacitors Csth and Cstl. These first and second storage capacitors Csth and Cstl enhance the voltage storage capacity of the first and second liquid crystal capacitors Clch and Clcl.

The coupling electrode 126 and the expansion 177c of the third drain electrode 175c overlap each other via the gate insulating layer 140 and the semiconductor layers 157 and 167, thereby forming the step-down capacitor Cstd. In another exemplary embodiment of the present invention, the semiconductor layers 157 and 167 may be removed between the coupling electrode 126 and the expansion 177c of the third drain electrode 175c, forming the step-down capacitor Cstd.

A colored member 320 is formed on the upper passivation layer 180q. The colored member 320 is disposed on the light blocking member 220. The colored member 320 is formed generally along the gate line 121 and the step-down gate line 123, and includes a first colored member 320a and a second colored member 320b. The colored members 320a, 320b are disposed generally along the first light blocking member 220a, (covering the region where the first thin film transistor Qh, the second thin film transistor Ql, and the third thin film transistor Qc are positioned), as well as the second light blocking member 220b extended generally along the data line 171. That is, portions of the colored member 320 generally cover both the thin film transistors (or at least portions thereof) and the data lines of the display. The first colored member 320a may completely cover the gate line and the thin film transistors Qh, Ql, and Qc. The second colored member 320b may completely cover the data line 171.

The colored members 320a and 320b compensate for height differences between the light blocking member 220 and the color filter 230, thereby maintaining a more uniform cell gap, or cell interval. That is, the upper surfaces of the colored members 320a, 320b are substantially planar with the upper surfaces of their adjacent color filters, substantially smoothing out any height differences between the light blocking members 220 and their neighboring color filters 230. The liquid crystal thus contacts a smoother surface with fewer changes in elevation, preventing unwanted mis-orientations of the liquid crystal and therefore improving light leakage. Also, the colored members 320a, 320b fill in areas that would have been taken up by liquid crystal, thus reducing the total amount of liquid crystal required for a display.

A lower alignment layer (not shown) is formed on the pixel electrode 191, the exposed upper passivation layer 180q, and the colored members 320a and 320b. The lower alignment layer may be a vertical alignment layer.

Next, the upper panel 200 will be described.

A common electrode 270 is formed on the insulation substrate 210. An upper alignment layer (not shown) is formed on the common electrode 270. The upper alignment layer may be a vertical alignment layer.

Polarizers (not shown) are provided on the outer surfaces of the two display panels 100 and 200. Preferably, the transmissive axes of two polarizers are crossed, and it is preferable that one transmissive axis is parallel to the gate line 121.

The liquid crystal layer 3 has negative dielectric anisotropy. The liquid crystal molecules of the liquid crystal layer 3 are arranged such that a longitudinal axis of the liquid crystal molecules may be perpendicular to the surfaces of the two panels 100 and 200 when no electric field is present. Accordingly, when pixels are switched off, incident light is blocked by the crossed polarizers, and the pixels do not emit light.

As described above, the first subpixel electrode 191h and the second subpixel electrode 191l, along with the common electrode 270, generate an electric field when a data voltage is applied. Thus, when no data voltage is applied and no electric field is present, the liquid crystal molecules are oriented perpendicular to the surfaces of the two panels 100, 200. When a data voltage is applied, the liquid crystal molecules are oriented generally parallel to the directions of the electrodes 191, 270, thus altering the luminance of light in a specified manner.

According to another exemplary embodiment of the present invention, the liquid crystal display may further include a spacer 325 to maintain the cell interval between the two display panels 100 and 200, and the spacer 325 may be simultaneously formed with, and/or of the same layer as, the colored members 320a and 320b.

Figure 6A:
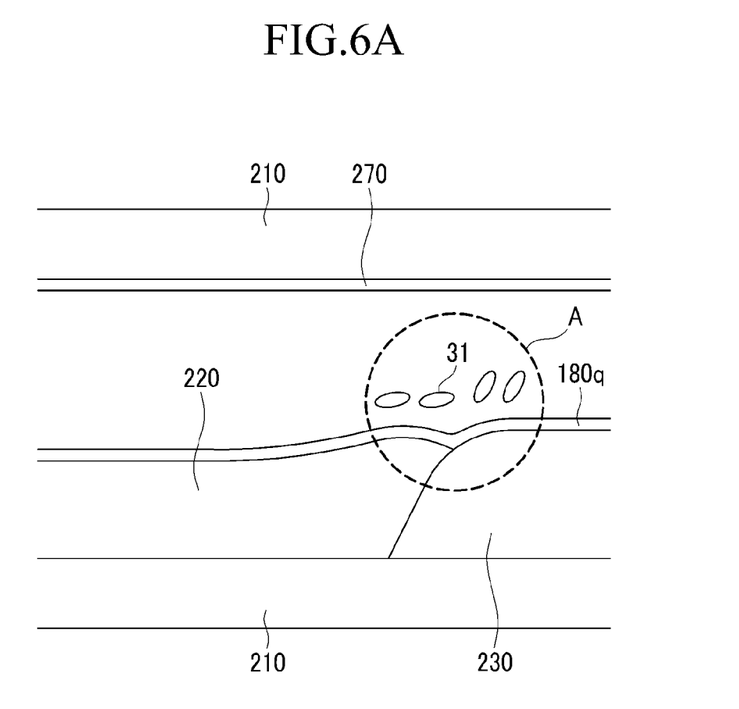
FIG. 6A and FIG. 6B are schematic views showing direction control of liquid crystal molecules.

Next, control of the liquid crystal molecule of the liquid crystal display according to an exemplary embodiment of the present invention will be described with reference to FIG. 6A and FIG. 6B. FIG. 6A is a schematic view showing direction control of liquid crystal molecules at a step between the color filter 230 and the light blocking member 220, while FIG. 6B is a schematic view showing direction control of liquid crystal molecules when this step is not present.

Referring to FIG. 6A, there is essentially a step discontinuity in height between the upper surfaces of the light blocking member 220 and the color filter 230. Furthermore, the upper surface of at least the light blocking member 220 tends to be irregular and somewhat difficult to control in the area proximate to where the member 220 intersects the color filter 230. As can be seen from FIG. 6A, this irregular surface results in irregular orientation of the liquid crystal molecules 31 in the boundary region where the member 220 and color filter 230 intersect—a region roughly delineated by area A. This irregular orientation can result in undesired visual effects, such as staining or light leakage.

Figure 6B:
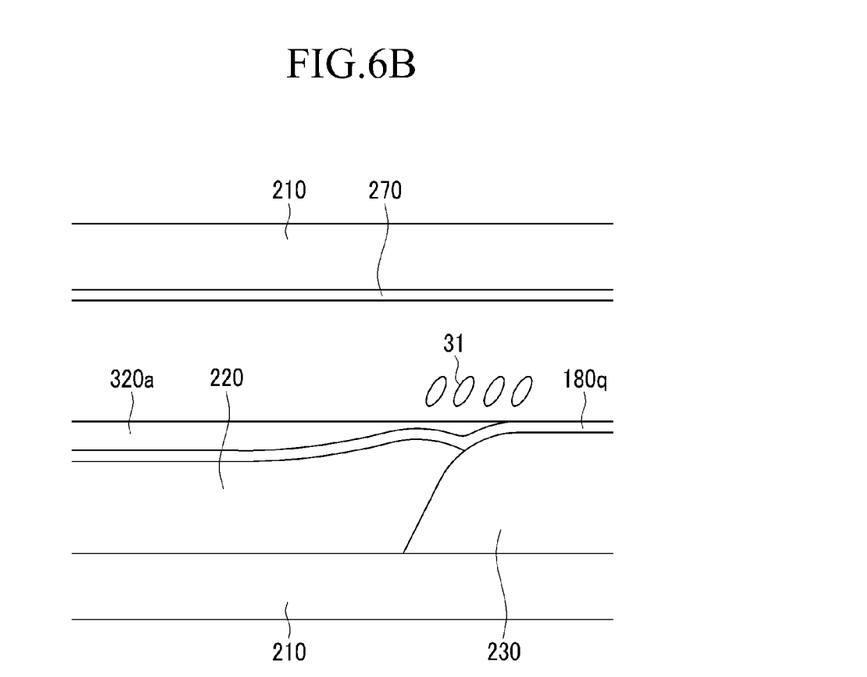

Referring to FIG. 6B, the liquid crystal display according to an exemplary embodiment of the present invention includes colored members 320 disposed on the light blocking member 220 to compensate for height differences between the light blocking member 220 and the color filter 230. That is, the colored member 320 fills in areas where the upper surface of the light blocking member 220 (or any of its overlying layers) is lower than the upper surface of the color filter 230 (or any of its overlying layers). In this manner, the colored member 320 creates a substantially planar surface contacting the liquid crystal layer, at least in the area overlying the intersection of the light blocking member 220 and color filter 230. Accordingly, no step discontinuity in height is present at the boundary portion of the light blocking member 220 and the color filter 230, allowing for the overlying liquid crystal molecules 31 to be more uniformly oriented. In particular, the overlying liquid crystal molecules 31 are more uniformly pre-tilted by the edges of the minute branches 194a, 194b, 194c, and 194d, as the geometry of area A is no longer irregular, and does not itself induce any orientation of molecules 31. Accordingly, the pretilt directions of the liquid crystal molecules 31 are more uniformly controlled, so as to produce more uniform inclination directions of the liquid crystal molecules 31. This in turn reduces staining and light leakage in the display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a gate line disposed on the first substrate, the gate line extending along a first direction;
a data line disposed on the first substrate, the data line extending along a second direction perpendicular to the first direction;
a thin film transistor connected to the gate line and the data line;
a storage electrode disposed on the first substrate;
a color filter disposed on the first substrate;
a light blocking member disposed on the gate line, the data line and the thin film transistor;
a pixel electrode disposed on the color filter and the light blocking member; and
a colored member formed on the pixel electrode and disposed on the light blocking member,
wherein the light blocking member includes a first light blocking portion,
wherein the colored member includes a first colored portion, and
wherein each of the first light blocking portion and the first colored portion extends generally along the gate line and generally covers the gate line and the thin film transistor.

2. The liquid crystal display of claim 1, further comprising:
wherein the light blocking member further includes a second light blocking portion and the colored member further includes a second colored portion, and
wherein the second light blocking portion and the second color portion extend generally along a data line and at least partially overlap the data line.

3. The liquid crystal display of claim 1, wherein
the liquid crystal display further includes a spacer to maintain a cell interval, and
the colored member has a height lower than the spacer.

4. The liquid crystal display of claim 3, wherein
the spacer is formed in the same layer as the colored member.

5. The liquid crystal display of claim 1, wherein
the light blocking member has a height lower than the color filter in a region where the light blocking member is proximate to the color filter.

6. The liquid crystal display of claim 5, wherein
the cell interval is substantially uniform at the region where the colored member is disposed and the region where the color filter is disposed throughout the region where the light blocking member is proximate to the color filter.

7. The liquid crystal display of claim 1, further comprising:
a second substrate facing the first substrate; and
a liquid crystal layer interposed between the first substrate and the second substrate and including a plurality of liquid crystal molecules,
wherein, for a boundary region where the color filter is proximate to the light blocking member, the liquid crystal molecules disposed in the boundary region are pre-tilted in substantially the same direction as the liquid crystal molecules outside the boundary region and disposed on the color filter.

8. The liquid crystal display of claim 7,
wherein the liquid crystal molecules disposed in the boundary region are pre-tilted according to branch electrodes.

9. The liquid crystal display of claim 8, further comprising
a first polarizer and a second polarizer disposed on outer surfaces of, respectively, the first substrate and the second substrate,
wherein the transmissive axes of the first polarizer and the second polarizer are crossed, and
wherein the liquid crystal molecules are oriented parallel to the first substrate and the second substrate when an electric field is applied thereto.

10. The liquid crystal display of claim 1, wherein the first colored portion completely covers the gate line.

11. The liquid crystal display of claim 1, wherein the first colored portion completely covers the thin film transistor.

12. The liquid crystal display of claim 1, further comprising a second thin film transistor, wherein the first colored portion further covers the second thin film transistor.

13. The liquid crystal display of claim 12, further comprising a third thin film transistor, wherein the first colored portion further covers the third thin film transistor.

14. The liquid crystal display of claim 2, wherein the colored member comprising a spacer to maintain a cell interval.

15. The liquid crystal display of claim 14, wherein an upper surface of the colored member is substantially planar with an upper surface of adjacent color filter.

16. The liquid crystal display of claim 15, further comprising a passivation layer formed between the colored member and the light blocking member.

17. The liquid crystal display of claim 14, further comprising a passivation layer formed between the colored member and the light blocking member.

18. The liquid crystal display of claim 2, wherein an upper surface of the colored member is substantially planar with an upper surface of adjacent color filter.

19. The liquid crystal display of claim 18, further comprising a passivation layer formed between the colored member and the light blocking member.

20. The liquid crystal display of claim 2, further comprising a passivation layer formed between the colored member and the light blocking member.

* * * * *